(12) United States Patent
Grime et al.

(10) Patent No.: US 11,279,907 B2
(45) Date of Patent: Mar. 22, 2022

(54) METHOD AND SYSTEM FOR AGING SPIRITS

(71) Applicants: Gregory B. Grime, Townsend, TN (US); Robert W. Casey, Knoxville, TN (US)

(72) Inventors: Gregory B. Grime, Townsend, TN (US); Robert W. Casey, Knoxville, TN (US)

(*) Notice: Subject to any disclaimer, the term of this patent is extended or adjusted under 35 U.S.C. 154(b) by 49 days.

(21) Appl. No.: 16/545,710

(22) Filed: Aug. 20, 2019

(65) Prior Publication Data
US 2020/0056133 A1    Feb. 20, 2020

Related U.S. Application Data

(60) Provisional application No. 62/765,260, filed on Aug. 20, 2018.

(51) Int. Cl.
*C12H 1/22* (2006.01)
*B65D 8/00* (2006.01)
*B65D 85/72* (2006.01)

(52) U.S. Cl.
CPC ............... *C12H 1/22* (2013.01); *B65D 9/04* (2013.01); *B65D 85/72* (2013.01)

(58) Field of Classification Search
CPC ... C12H 1/22; C12H 1/20; B65D 9/04; B65D 85/72; B65D 88/1656; Y10S 220/913; C12G 1/0206; C12G 1/0209; C12G 2200/25
See application file for complete search history.

(56) References Cited

U.S. PATENT DOCUMENTS

| 739,929 | A | * | 9/1903 | Ross | B62D 25/24 217/104 |
|---|---|---|---|---|---|
| 2,511,877 | A | * | 6/1950 | Protzeller | A23L 3/361 62/61 |
| 3,528,817 | A | * | 9/1970 | Strickland | C12G 1/02 426/15 |
| 3,734,359 | A | * | 5/1973 | Waterman | B65D 47/305 222/484 |
| 4,826,029 | A |   | 5/1989 | Skoglie |   |
| 5,038,867 | A | * | 8/1991 | Hindrichs | A62C 99/0018 169/62 |

(Continued)

FOREIGN PATENT DOCUMENTS

WO    WO2003016177    2/2003

OTHER PUBLICATIONS

Cervera, Travel shock. Jonas Tofterup on the effects of travel on wine, (Mar. 12, 2019) ; Spanish Wine Lover; https://www.spanishwinelover.com/enjoy-367-travel-shock-jonas-tofterup-on-the-effects-of-travel-on-wine (Year: 2019).*

(Continued)

*Primary Examiner* — Drew E Becker
*Assistant Examiner* — Austin Parker Taylor
(74) *Attorney, Agent, or Firm* — Blanchard & Associates (57) ABSTRACT

A method of aging distilled spirits, and a system to perform the method, the method including storing the distilled spirits in one or more containment vessels, securing the containment vessels in an unpressurized and ventilated cargo area of a selected flight vessel, and transporting the containment vessels from at least a first destination to at least a second destination upon the selected flight vessel.

14 Claims, 9 Drawing Sheets

(56) References Cited

U.S. PATENT DOCUMENTS

| | | | |
|---|---|---|---|
| 5,976,583 A | 11/1999 | Mastrocola | |
| 9,212,343 B1* | 12/2015 | Karasch | C12H 1/12 |
| 2008/0105328 A1* | 5/2008 | Desmond | A45F 5/00 |
| | | | 141/2 |
| 2014/0157797 A1* | 6/2014 | Kovalick | F25D 3/06 |
| | | | 62/60 |
| 2018/0057780 A1* | 3/2018 | DeCaro | A23L 2/56 |
| 2018/0142192 A1 | 5/2018 | Ingram, III | |
| 2018/0216055 A1* | 8/2018 | Maruyama | C12H 1/22 |

OTHER PUBLICATIONS

Khushbu Shah; "Southern Comfort Launches Drone Booze Delivery Program" Mar. 31, 2015, 2:29pm EDT Eater https://www.eater.com/2015/3/31/8320489/southern-comfort-launches-drone-booze-delivery-program (Year: 2015).*

"What's Cargo Manifest?" moving-australia.co.uk 2015 https://web.archive.org/web/20150922112657/https://www.moving-australia.co.uk/advice/cargo-manifest.php (Year: 2015).*

Dr. Bill Lumsden, "The Impact of Micro-Gravity on the Release of Oak Extractives into Spirit" www.ardbeg.com/sites/ardbeg.com/files/2017-10/ARD9109SupernovaWhitePaper, Sep. 2011.

Amy Hopkins, "Rapid Ageing Spirits Tech Receives Patents", https://www.thespiritsbusiness.com/2017/04/rapid-ageing-spirits-tech-receives-patents/ Mar. 4, 2017.

Grush, "Whiskey aged in space tastes like throat lozenges and rubbery smoke", The Verge, Sep. 10, 2015 (pp. 105). https://www.theverge.com/2015/9/10/9300435/whiskey-space-taste-test-ardbeg-distillery-nanoracks.

Marsteller, "5 Revolutionary Aging Techniques that Look Beyond the Barrel", Liquor.com, May 1, 2015 (p. 1-8). https://www.liquor.com/articles/experimental-spirits-aging-techniques/#gs.c69p6w.

Patent Cooperation Treaty, International Search Report, Form PCT/ISA/220, dated Nov. 27, 2019.

* cited by examiner

METHOD AND SYSTEM FOR AGING SPIRITS

CROSS-REFERENCE TO RELATED APPLICATIONS

This application claims the benefit of U.S. Provisional Patent Application Ser. No. 62/765,260, filed on Aug. 20, 2018, which is incorporated herein in its entirety by reference.

FIELD OF INVENTION

The present general inventive concept relates to a method and system for aging distilled spirits, and, more particularly, to a method and system for aging potable alcoholic spirits by transporting the spirits through different areas and altitudes.

BACKGROUND

Figure 1:
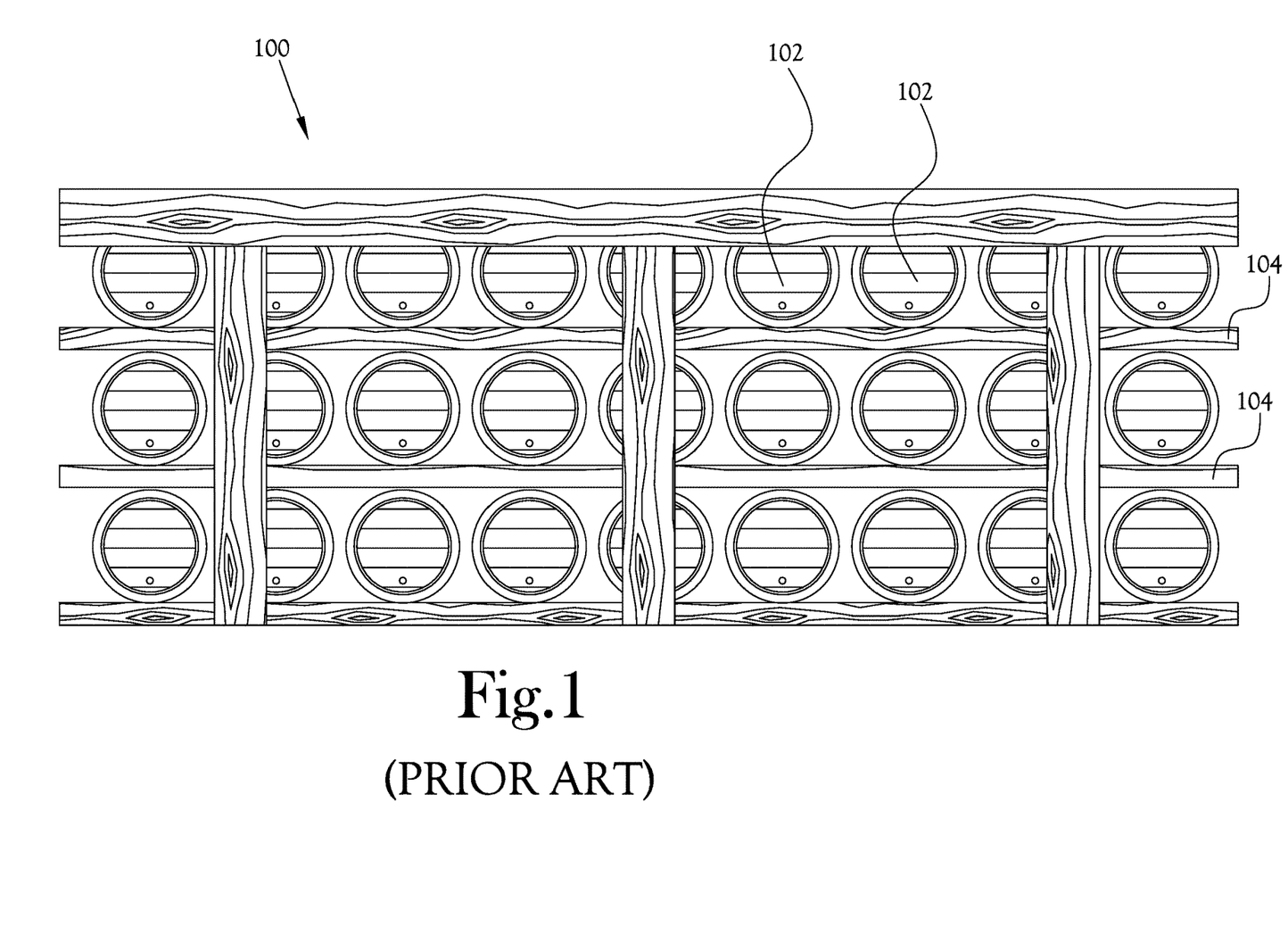
FIG. 1 illustrates a typical traditional method of aging spirits.

Conventional aging methods and systems utilized in the aging of spirits range from the traditional methods wherein distilled spirits are warehoused in white oak barrels with a charred interior for periods typically measured in years to allow the spirits to reach maturity in an environment wherein the length of maturity is largely contingent upon climatic changes due to seasonal change, to more modern methods of which some are capable of aging spirits to maturity with the time duration measured in much shorter intervals such as weeks or even days. FIG. 1 illustrates a typical traditional method of aging spirits, wherein a warehouse or other such storage facility 100 has a plurality of shelves 104, racks, etc., on which barrels 102 of the spirits are simply placed to rest for a number of years. Some spirits may be thusly aged for periods of 4 years, 10 years, 13 years, and so on. The shortened modern methods mentioned above typically rely solely upon manmade mechanical devices and processes which directly alter variables such as temperature and pressure to move the distilled spirits in and out of oak char or similar media, rather than simply sitting for years, for calculated and predictable efficacy. Whether applying traditional or modern aging methods, the basic premise of aging spirits has always relied upon, and remains dependent upon, distilled spirits moving across a charred, cellulose medium such as white oak or other suitable wood. The primary and favorable results of using charred white oak are the removal of any remaining impurities from the distilled spirit, along with the added benefit of distinct and inviting alterations to the color and flavor of the spirit. Pure ethanol, by nature, is a clear liquid that is distilled from a variety of natural crops such as corn, grain, and barley. From all accounts, aging distilled spirits in charred white oak barrels for better and distinct taste was discovered by accident due to the need for a robust and cost-effective means to transport goods for consumption. Cooperages have produced barrels for centuries and offered the perfect vessel to not only store but also transport liquids and solid foods intended for human consumption, including distilled spirits. It was noted over time, due to the interest in increasing profit margins, that spirits stored in white oak barrels that had been repurposed by means of charring the interior for a cost effective approach to cleaning prior to adding distilled spirits for transport or storage provided a more refined and pleasurable product directly related to the duration and environmental changes experienced both during transport and storage, therefore commanding higher prices at resale because of demand when compared to "unaged" spirits.

Then, just as now, the ebb and tide of absorption of distilled spirits into charred wood allows for the adsorption of unwanted compounds such as Sulphur and exposure to compounds such as hemicellulose that break down to wood sugars to add caramel, brown sugar and/or toffee notes, along with a distinct change in the distilled spirit's color from clear to light golden amber all the way to a dark chocolate opaque, creates a product that remains in high demand. Though the science and art of distillation and the aging of spirits has been around for centuries, there remain substantial avenues for innovation and experimentation which appear to just now be surfacing in part due to changes in laws regarding the distillation of spirits more specifically relating to changes in individual state law to allow for greater volumes of production. While the above methods are both viable options to produce an end product of aged spirits, the traditional method focuses in large part on century's old techniques and the other on the application of scientific intervention and machinery to essentially produce an aged product with laboratory precision.

Therefore, it would be desirable to develop new methods and processes for improving and shortening the aging process of the distilled spirits, to provide even more increased quality of the aged spirits in more shortened aging intervals.

BRIEF SUMMARY

According to various example embodiments of the present general inventive concept, a method and system is provided to age distilled spirits by arranging spirit storage vessels on a craft capable of flight, and transporting the spirits between various destinations.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a method of aging distilled spirits, the method including storing the distilled spirits in one or more containment vessels, securing the containment vessels in an unpressurized and ventilated cargo area of a selected flight vessel, and transporting the containment vessels from at least a first destination to at least a second destination upon the selected flight vessel.

The foregoing and/or other aspects and advantages of the present general inventive concept may also be achieved by providing a system to age distilled spirits, the system including a containment vessel having a bunghole and configured to store distilled spirits therein, a bung plug configured to be inserted in the bunghole, the bung plug having a channel formed therein in an axial direction, and a diaphragm coupled to the bung plug and configured to contain vapor and/or liquid passed through the channel of the bung plug.

The foregoing and/or other aspects and advantages of the present general inventive concept may also be achieved by providing a system to age distilled spirits, the system including a plurality of containment vessels respectively provided with bungholes, the containment vessels configured to store distilled spirits therein, at least one vapor collection vessel provided with a diaphragm configured to contain vapor and/or liquid passed from the vapor collection vessel to the diaphragm, and a plumbing line configured to provide connection between the vapor collection vessel and the bungholes of the containment vessels, wherein vapor and/or liquid passed from the containment vessels are allowed to pass to and from the vapor collection vessel.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Various example embodiments of the present general inventive concept provide a method and system for transporting barrels of distilled spirits on aircraft to be transported between various destinations to improve the aging process of the spirits. In the various example embodiments described herein the charred barrels, casks, or other such containers containing the spirits may be referred to as containment vessels, and the containment vessels are loaded onto a cargo plane or other such flying vessel to take advantage of the movement and pressure differences encountered in one or more flights between various destinations. In various example embodiments of the present general inventive concept these containment vessels may be rigidly secured into an unpressurized and ventilated cargo area of a selected platform capable of flight. Doing so prevents shifting of the aging barrels and exposes them to the unaltered and unmoderated atmospheric variables that wouldn't be afforded if they were in a pressurized compartment, as well as providing adequate ventilation for added safety due to any possible vapor accumulation. It is noted that while vapor accumulation features are discussed herein, it is understood that both vapor and liquid expansion and issues may be referred to herein as simply vapor expansion, movement, and so on. Flight planning calculations such as destination, cruise altitude, duration, ambient temperature, and humidity, both at the departure, destination, and airborne phases, turbulence, and the size of the containment vessels are many of the possible variables that may be taken into consideration. All the above aforementioned variables, preparations, and planning culminate with the production of a reasonably predictable and uniquely aged spirit.

Figure 2:
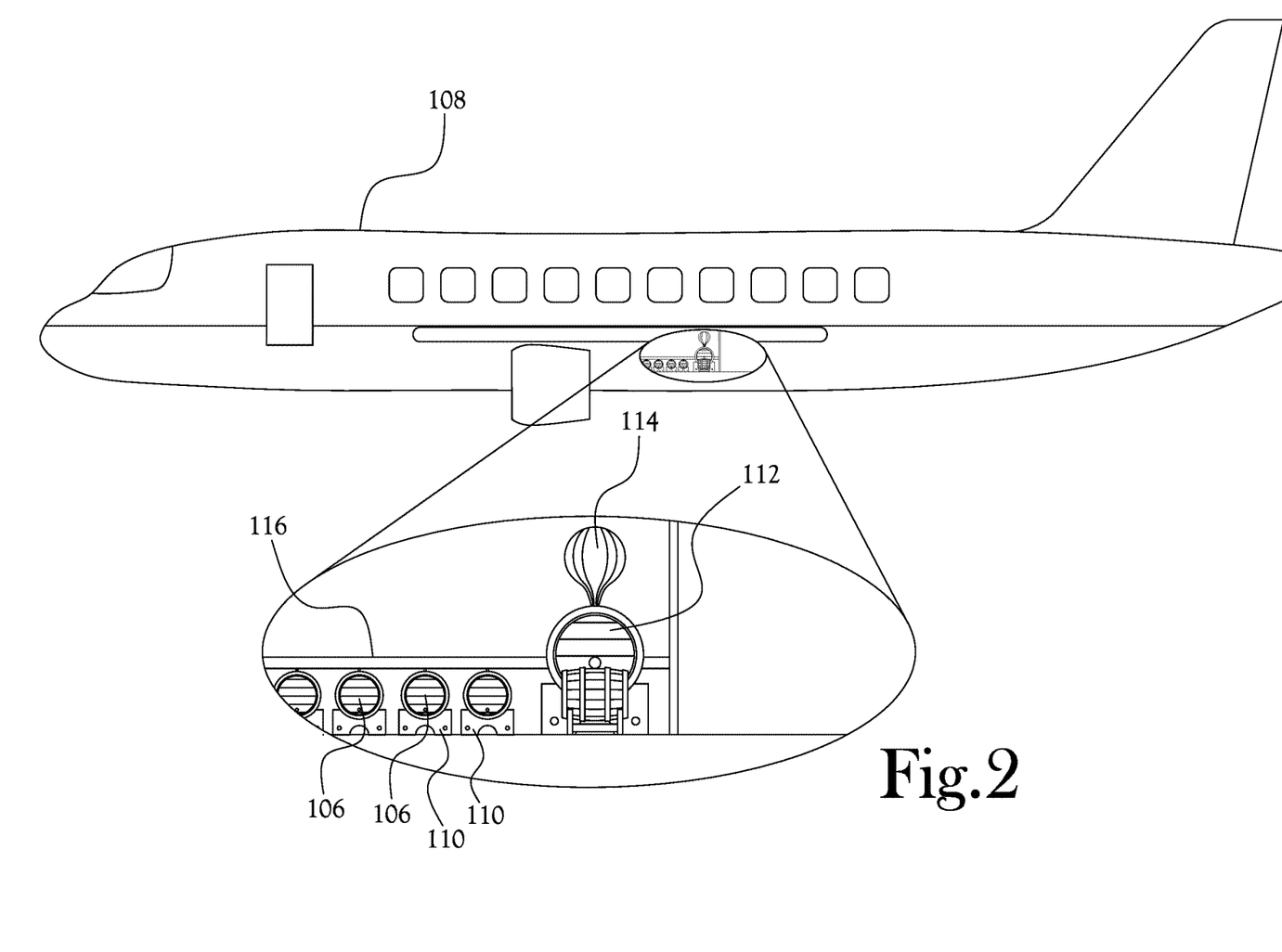
FIG. 2 illustrates a method of aging spirits according to an example embodiment of the present general inventive concept.

FIG. 2 illustrates a method of aging spirits according to an example embodiment of the present general inventive concept. As illustrated in this example embodiment, a plurality of containment vessels 106 are arranged on securing racks 110 in a storage area of an air vessel 108. While the air vessel 108 illustrated in FIG. 2 is jet-powered, it is understood that the present general inventive concept may be practiced in any number of aircraft, such as propeller driven planes and so on, including cargo or general transportation planes. In this example embodiment, the containment vessels are arranged to have a common ventilation line 116 to allow for expansion of gases, which is illustrated in more detail in FIG. 3.

Figure 3:
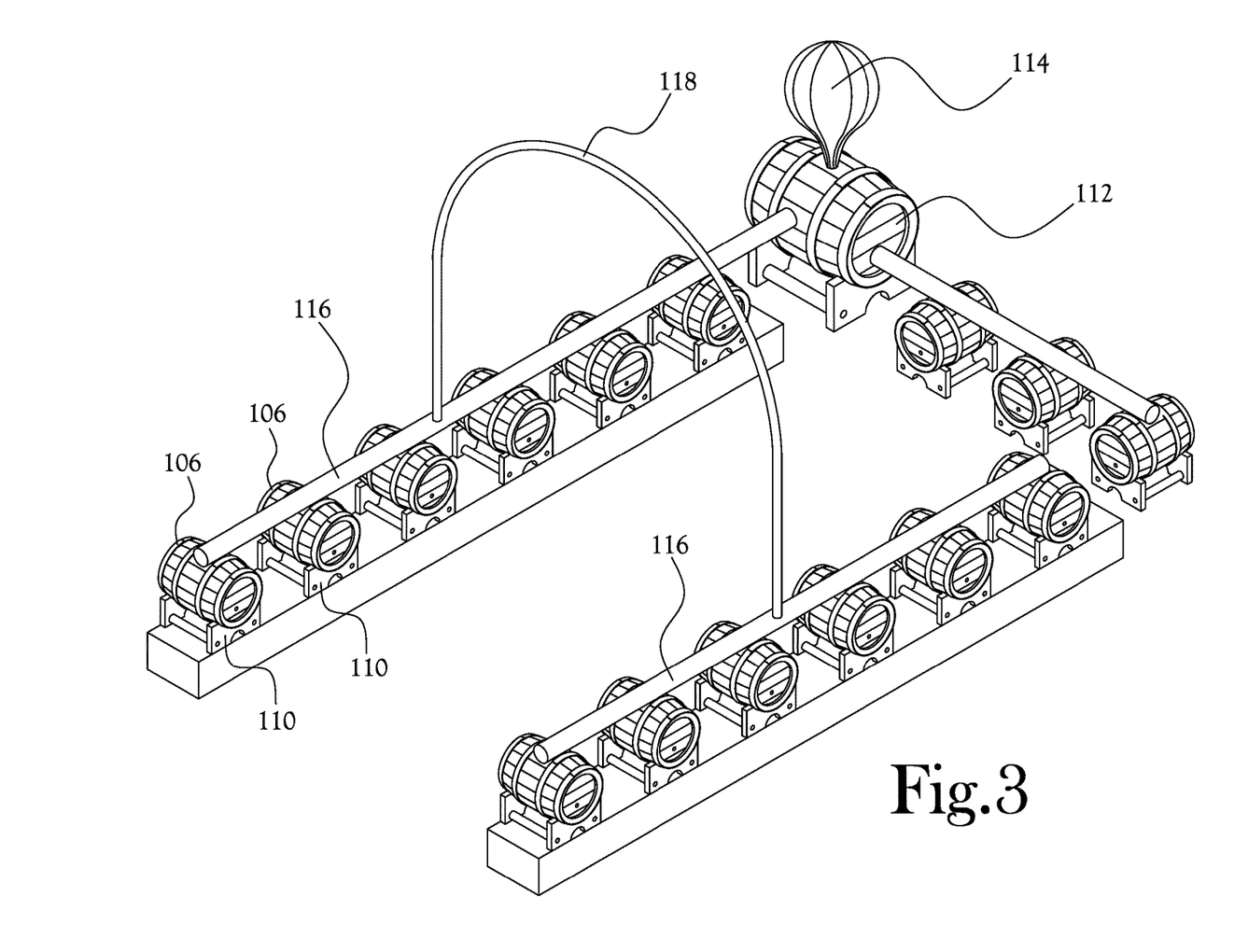
FIG. 3 illustrates a spirit aging system used in the method illustrated in FIG. 2 according to an example embodiment of the present general inventive concept.

FIG. 3 illustrates a spirit aging system used in the method illustrated in FIG. 2 according to an example embodiment of the present general inventive concept. As illustrated in FIG. 3, several rows of spirit containment vessels 106 are arranged such that each containment vessel 106 in a row is connected to a ventilation line 116 that is connected to a single vapor collection point, which may be a master overflow collection barrel referred to herein as a vapor collection vessel 112. The vapor collection vessel 112 is fitted with an expandable balloon or diaphragm 114 that will accept excess vapor collected in the vapor collection vessel 112, expanding when needed to maintain the vapors of all of the containment vessels 106 in a closed system. In this example embodiment, the vapor collection vessel 112 is only used for vapor collection, and does not contain pre-deposited spirits within. In this example embodiment, the vapor collection vessel 112 is similar in construction to the containment vessels 106 themselves, although on a larger scale. Various other example embodiments may provide differently configured vapor collection vessels or systems. The configuration and operation of the diaphragm 114 will be described in more detail herein. Also, while this example embodiment shows a single vapor collection vessel 112 fitted with a single diaphragm 114, it is understood that various other example embodiments may be employed without departing from the scope of the present general inventive concept. For example, each of the containment vessels 106 may be individually fitted with a diaphragm 114 for vapor expansion. In the example embodiments illustrated in FIGS. 2-3, the ventilation lines 116 are in communication with the containment vessels 106 through the bunghole of each of the containment vessels 106. The bungholes provide a convenient way to release vapor into the ventilation lines 116, and then be easily plugged back up when the ventilation lines 116 are removed. Due to the arrangement of the rows of containment vessels 106 illustrated in FIG. 3, a connection line 118 spans between two of the ventilation lines 116, so that each ventilation line 116 is able to convey vapors to the vapor collection vessel 112, all while the respective rows of containment vessels 106 are racked securely beside one another. The ventilation lines 116 and connection line 118 may include food grade plumbing.

Figure 4:
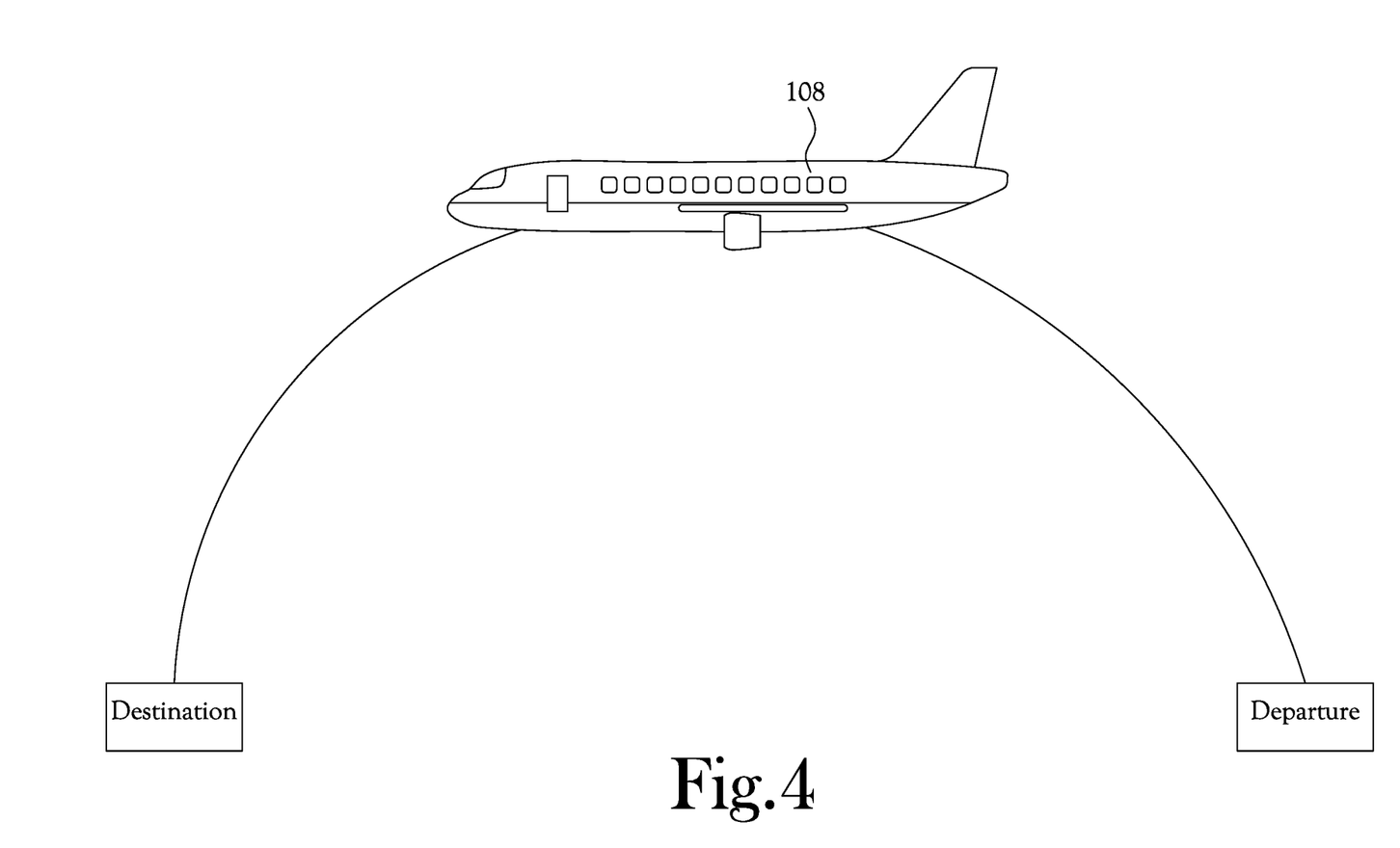
FIG. 4 illustrates a simple flight path of the aircraft illustrated in FIG. 2.

FIG. 4 illustrates a simple flight path of the aircraft 108 illustrated in FIG. 2. When loaded onto the aircraft 108, the spirits in the containment vessels 106 arranged therein are subjected to wide ranging values regarding pressure, temperature, turbulence, and so on between taking off at a departure point and arriving at a destination. Further, when subjected to such changes on a plurality of such flights, which may be from widely varied locales, the expedited aging process is improved even more. In various example embodiments, if transported on, for example, a daily basis, the process of the present general inventive concept could provide aging in 30 days that might be comparable to warehouse aging of 48-58 days in some cases. As an example, a flight from McGhee Tyson Airfield in Knoxville, Tenn. to Key West International Airport may have a duration of 2.5 hours total flight time, 1.8 hours of which occurs as 28,000 feet above sea level, which provides a large variety in many of the ambient variables discussed above. In various example embodiments, a total flight duration of 2.5 hours, and including 1.8 hours at cruise altitude, gives ample time for chilling of the spirits at altitude, and therefore sets the stage for optimal rapid temperature differential occurrences.

It is noted that while the method and system of the present general inventive concept is capable of accelerating the maturation liter for liter compared to conventional methods, if it is so desired to impart a different facet or facets to the spirit, flight profiles may be altered so as to operate with more constrained differentials with regards to temperature, atmospheric pressure, etc. A reduction in the angels share paid could also be the result. Additionally, the typical duration to minimally age a 53 gallon/200 L barrel of spirits is 1 year. On average, the higher quality and most sought after spirits are aged at least 5-10 years, and some such as Pappy Van Winkle 20 years or more. While it is commonly known that the surface to volume ratio of an oak aging barrel has a tremendous impact on the time to maturation, that variable alone does nothing to displace a sharp contrast regarding maturation duration and the ultimate refinement of spirits regarding the method and system of the present general inventive concept.

Figures 5A, 5B, 6:
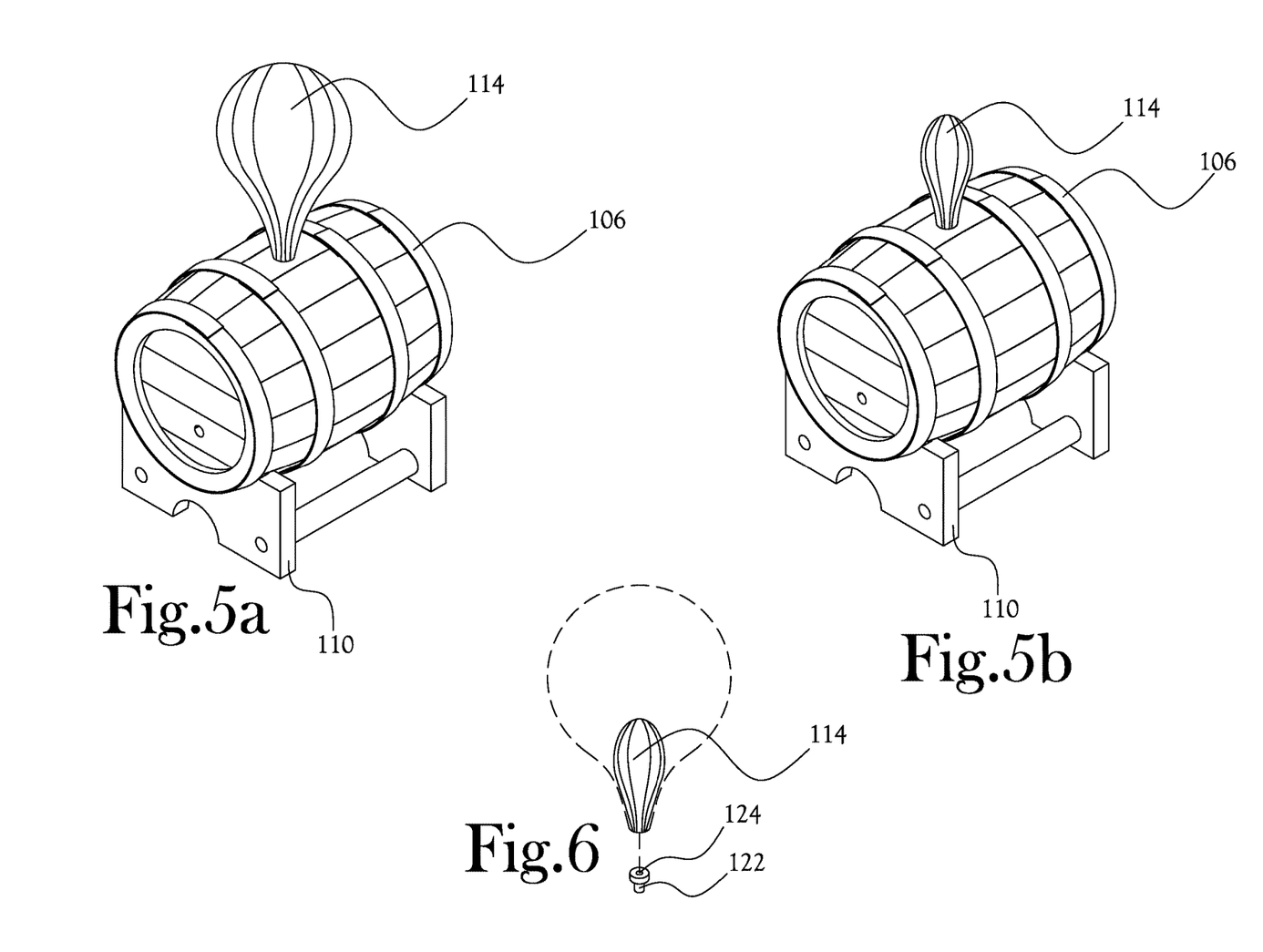
FIGS. 5A-B illustrate a vapor expansion diaphragm coupled to a containment vessel according to an example embodiment of the present general inventive concept.
FIG. 6 illustrates an exploded view of an expansion diaphragm arrangement according to an example embodiment of the present general inventive concept.

FIGS. 5A-B illustrate a vapor expansion diaphragm coupled to a containment vessel according to an example embodiment of the present general inventive concept. In this example embodiment a vapor expansion diaphragm 114 has been affixed to a bung plug of the containment vessel 106 for a convenient way of allowing vapor expansion during transit. In various example embodiments the diaphragm 114 may be a heavy weight food-grade latex balloon which may also be covered with a fire and puncture resistant sheath. Various other example embodiments may provide differently configured vapor expansion diaphragms to allow for the expansion and later contraction of vapors that are produced and/or affected by the transit variables encountered by the spirits contained in the containment vessel 106. According to various example embodiments of the present general inventive concept, the containment vessel 106 may be a standard size aging barrel, a 1 L barrel, or any of a host of other sizes. Thus, it is understood that either single barrels or networked barrels may be provided with one or more of the vapor expansion diaphragms (which also serve for liquid containment). In some example embodiments, it may not be desirable to network barrels of different ethanol blends.

FIG. 6 illustrates an exploded view of an expansion diaphragm arrangement according to an example embodiment of the present general inventive concept. As illustrated in FIG. 6, the diaphragm 114 may be fitted to the bung plug 122 in any of a variety of fashions, and a channel 124 is formed in the bung plug 122 to allow the vapor to move between the containment vessel 106 and the diaphragm 114. With such a configuration, the bung plug 122 may be fitted to the containment vessel 106 in a substantially conventional fashion, but vapor expansion due to extreme ambient changes to the spirits may be contained, thus providing a simple yet effective device to mitigate environmental variables. The dotted line illustrated in FIG. 6 shows an example size to which the diaphragm 114 may expand during transit. In various example embodiments, the channel 124 through the bung plug 122 may have, for example, a 1 mm (for 1 L barrel) diameter to allow an avenue for the expansion of contents (liquid & gaseous) within the barrel due to relative temperature and pressure changes encountered during the flight. In various example embodiments the diaphragm 114 may be a 1 L balloon. The 1 L volume (unexpanded) balloon serves as a device by which expansion due to pressure changes within the vessel is mitigated without directly exposing the contents to the atmosphere. The balloon and puncture/fire resistant sheath may be secured to the bung plug 122 with a heavy duty plastic zip tie or other suitable clamping device that will not compromise the integrity of the balloon, or may be secured through a number of other ways. The balloon is the simplest form of pressure mitigation, however, multiple and more complex variations of expanding diaphragms may be employed both in a singular or networked barrel system.

Figure 7A:
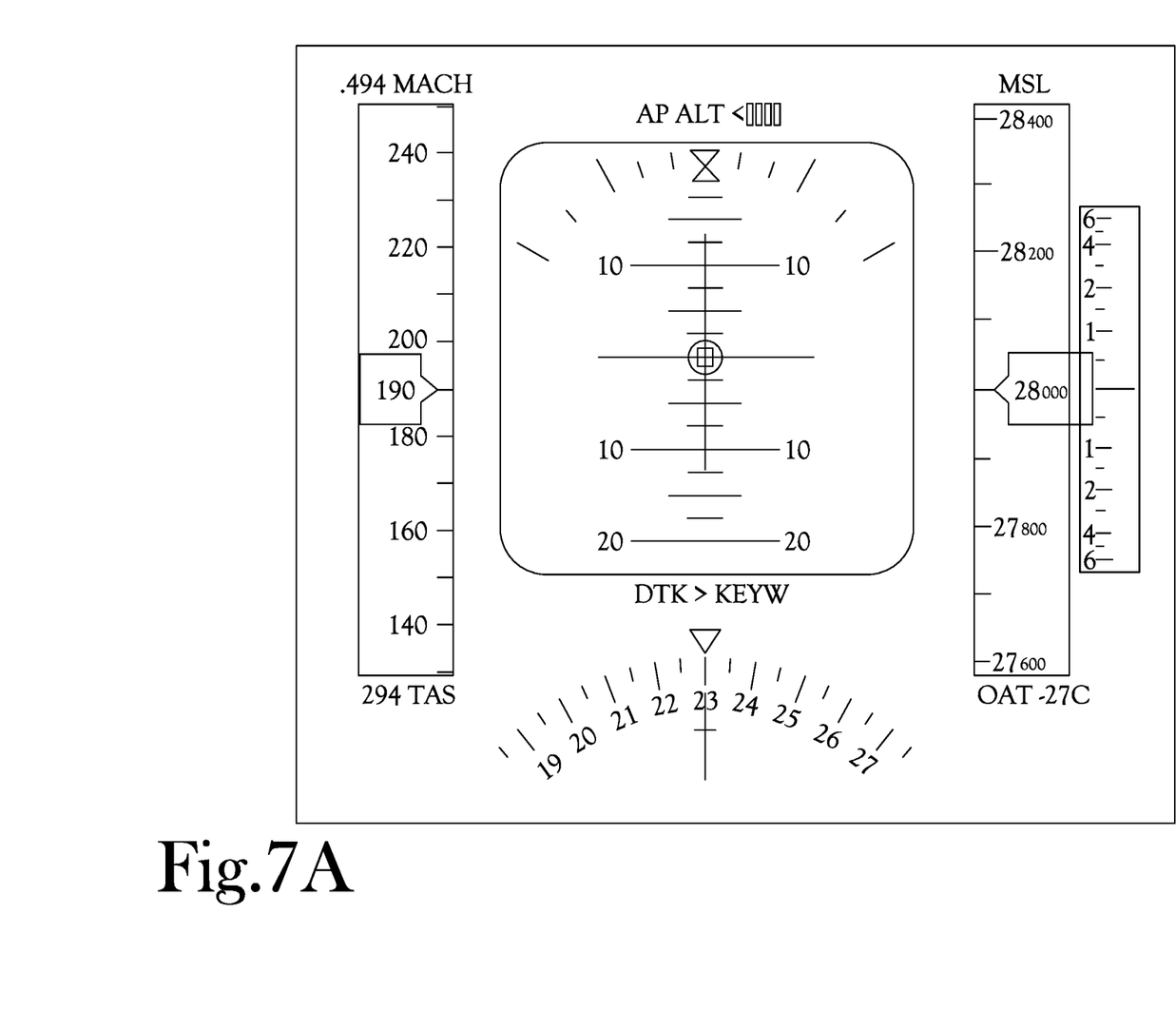
FIGS. 7A-C illustrate flight data indicating various ground and flight data that may be encountered during, before, and after a single flight.
Figure 7B:
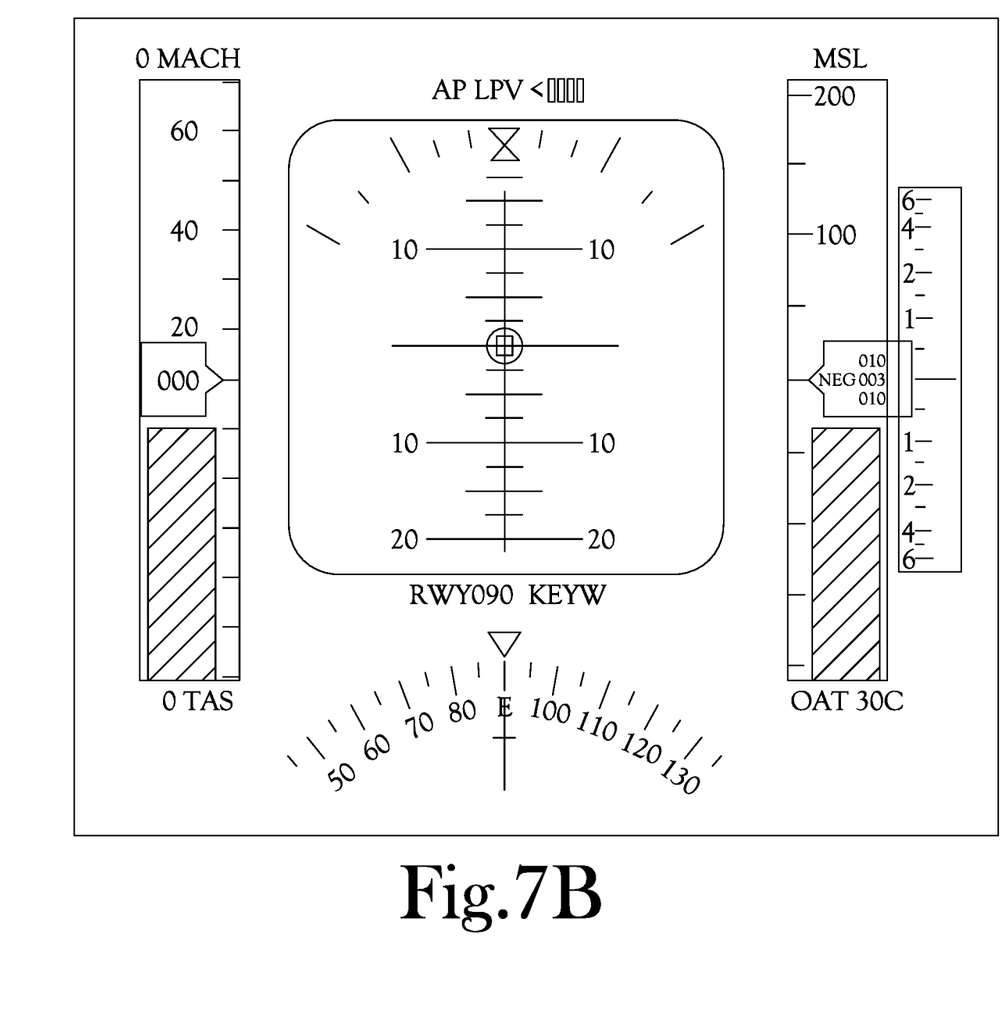
Figure 7C:
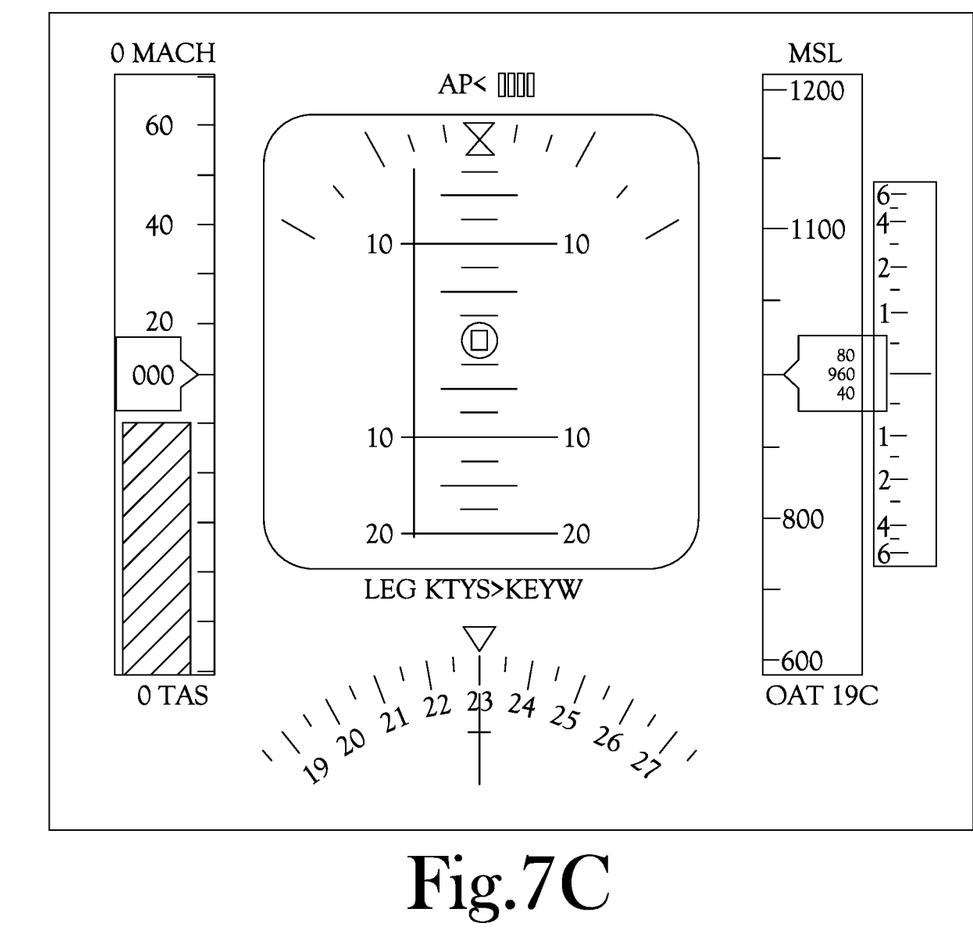

FIGS. 7A-C illustrate flight data indicating various ground and flight data that may be encountered during, before, and after a single flight. The example conditions illustrated in FIGS. 7A-C may be encountered in the previously described flight between Knoxville and Key West. FIG. 7A shows data pertaining to the mid-point of the flight, at an altitude of 28,000 feet above sea level, FIG. 7B shows data pertaining to the aircraft being on the ground at Key West after arrival, at approximately 3 feet above sea level, and FIG. 7C shows data pertaining to the aircraft being on the ground in Knoxville before departing, at 960 feet above sea level. Thus, it is evident how much the aging process may be improved and accelerated by the movement and ambient conditions encountered on a single flight, which would be vastly multiplied when the spirits are subjected to such changes over a period of, for example, 30 days. FIGS. 7A-C represent the data of a desired flight profile in which the spirits are subjected to temperatures aloft that are well below or right on the verge of freezing spirits (depending on proof and ethanol to H2O concentrations) during the cruise phase. Pure ethanol has a freezing point of −114 C at sea level. However, 80 proof ethanol has a freezing point on average of −27 C at sea level. While the decrease in atmospheric pressure will increase the freezing point, although not appreciably, for this method it is proposed that −27 C at cruise altitudes may give a desired temperature differential while not impeding the "ebb & tide" of spirits in and out of the char due to the general absence of solidification. A pronounced contrast in OAT (Outside Air Temperatures) is shown in degrees Celsius on the PFDs (Pilot Flight Displays), with the departure OAT at 19 C, cruise OAT at −27 C, and the destination OAT at 30 C. A conventional aging system would never be able to provide such rapid differential changes for obvious reasons. Collected technical data for this flight pattern, with respect to the aging of spirits based on this method and system, show the average maximum altitude at 22,824 FT MSL, average atmospheric pressure at cruising altitude at 0.41 ATM, and average outside air temperature at −7.9 C OAT; the total time to maturation for the spirits at 30 days; the total flight hours at 23.9 TT (total time airborne); and the average daily high and low temperatures averaged at the departure and destination airports being 30.1 C. With the typical maturation of 1 L of spirits being 48-58 days in a conventional venue such as that depicted in FIG. 1, the operational envelope afforded in this example comparatively summarizes and associates the environmental variables in reasonably predictable concert. Turbulence data is not expressed due to the irregularity of duration and unpredictability that is sometimes associated with this weather phenomenon. However, when implementing the method and system of the present general inventive concept, the spirits could be subjected to such forces including, but not limited to, agitation, vibration, etc.

Figure 8:
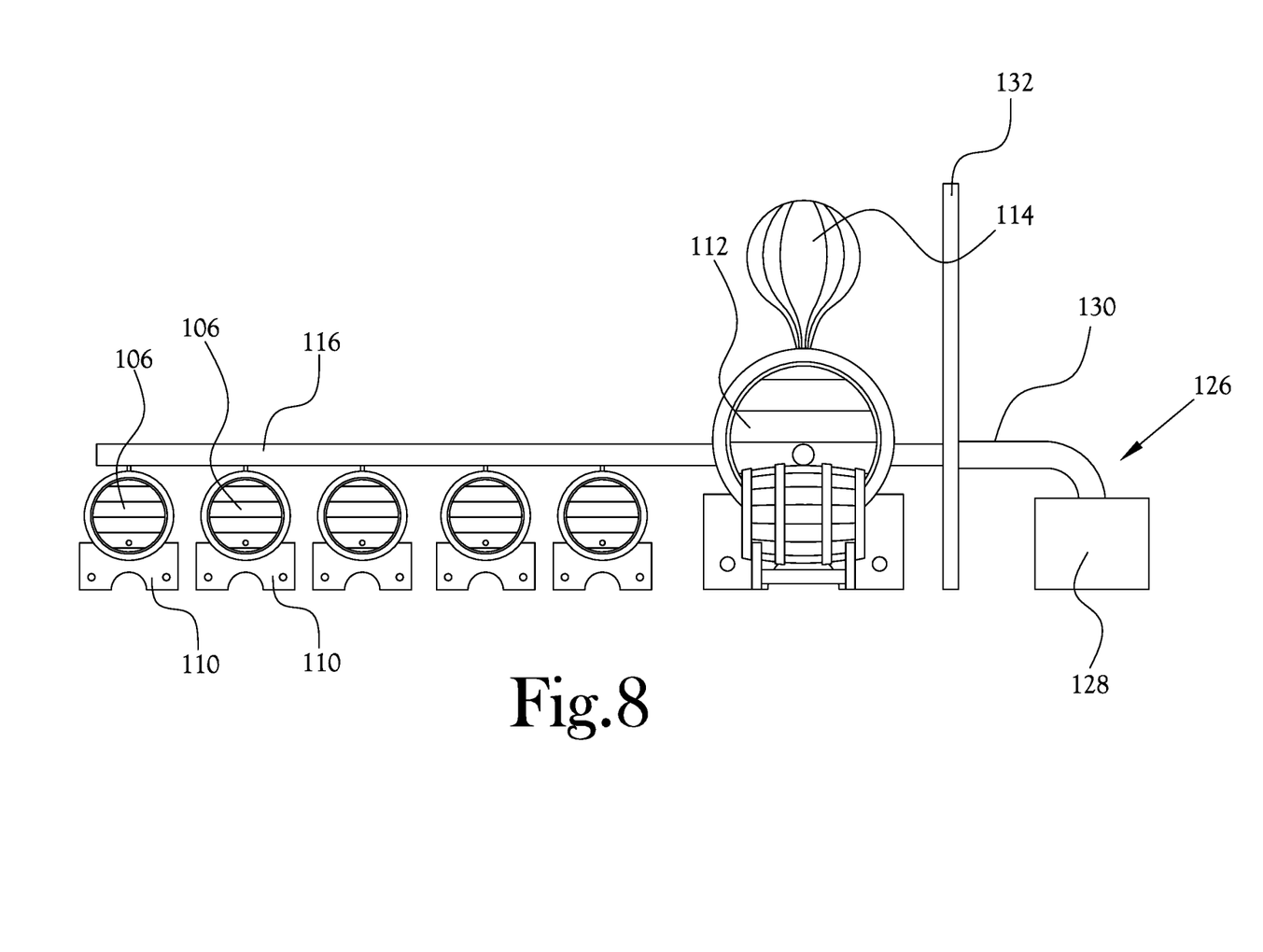
FIG. 8 illustrates a flight-based spirit aging system having emergency fire suppression according to an example embodiment of the present general inventive concept.

FIG. 8 illustrates a flight-based spirit aging system having emergency fire suppression according to an example embodiment of the present general inventive concept. In this example embodiment, and integrated Halon fire suppression system 126 is directly plumbed into the networked spirits ventilation system, or plumbing system. One or more fire suppression cannisters 128 are in communication with the vapor collection vessel 112 through a plumbing line 130, providing emergency fire suppression capability for the entire ventilation circuit of the networked spirit aging system, similar to a standard arrangement found on the engines of transport category aircraft. The fire suppression system 126 may be separated from the spirit aging system by a wall or partition 132.

In aging spirits in accordance with the method of this invention, the unaged raw spirits are contained within new or previously used traditional white oak barrels or casks with charred interior. The containment vessels are of a traditional design however the bung hole plug has been modified by drilling a small vertical hole from the outside of the bung plug [top] completely through, exiting the base of the bung plug so as to allow an avenue for pressure to escape into a fitted and secured heavy duty latex balloon [or plumbing networked system]. The balloon serves as a diaphragm to prevent the escape of any vapor or contents as well as preventing the bunghole plug from being expelled due to rapid pressure differentials attributed to environmental variables.

When operating in the manner prescribed by various examples of the method stipulated herein, the aging method is capable of allowing for the expedited aging of spirits via acceleration of evaporation through the containment vessels known as the angel's share. The angel's share is understood within the spirit aging industry as the volume of total contents of the vessel (barrel or cask) lost through evaporation. The portion of contents (ethanol) lost is tightly correlated with environmental variables. Geographical locations of aging warehouses in areas such as those located in Kentucky, USA and Scotland, UK have dissimilar evaporation (angel share) due to the local climates. Those in Kentucky age more quickly than those in Scotland due in great extent to the difference in seasonable variables, whereas Kentucky generally experiences warmer summers compared to those in not only Scotland but the UK as a whole. This method does not sacrifice the traditional methods of aging spirits in that it does not collect and reintegrate the angel's share, but in fact the method is capable of accelerating the aging process at the cost of a greater angel's share being paid, and thereby allows for a unique spirit of exceptional complexity along with other characteristics that may be varied by tailoring flight planning and logistics as described previously.

The present general inventive concept bridges the gap between the traditional and laboratory approaches by combining the attributes of seasonal, spatial (atmospheric), and geographical variables. This process uses both natural and indirect mechanical methods to impart rapid and significant pressure and temperature differentials due to the characteristics of flight and geographical relocation. Not only are the barreled stored, distilled spirits subjected to significant temperature and humidity plus moderate pressure changes by altering the geographical location due to the completion of flights on which they are manifested, but fluctuations applied due to the spatial orientation within the Earth's atmosphere allow for significant variances related to temperature, pressure and humidity as well. Likewise, the agitation from both atmospheric conditions and the physics of flight further lend to absorption and adsorption by mechanically moving more of the spirit in contact with the wood char. While weather conditions are chiefly predictable with modern instrumentation and interpretation, there are never absolutes, and as such the method presented takes advantage of this occasional unpredictability to produce aged spirits that can then be customized by strategic flight planning. Each "batch" is unpredictably predictable in that some will experience slightly more or less agitation and absorption/adsorption not only due to more or less agitation but also due to all the other environmental variables discussed previously. The duration of flight, cruising altitude, location of frontal boundaries, destination and duration at that destination, size of the barrel or casks, and even the amount of distilled spirits stored in each individual barrel during the aging process are all key components to the process. The present general inventive concept incorporates platforms capable of flight in order to in some cases shorten the duration of maturation if that is the intended and desired result. It is widely understood that temperate climates, typically defined as those exhibiting warm summers and mild winters, such as those found in certain regions of the Southeastern United States experience significant temperature variance due to seasonal change and therefore lend to faster maturation of spirits. With summer temperatures in this region (Middle & Eastern Tenn., Middle & Eastern Ky., Northern Ga., Western N.C., Southwestern Va., Upstate S.C.) typically reaching into the 90's, and with a greater than average humidity during those periods than you would find in the southwest or northwest US regions on any given day, along with moderate winters you will find the majority of the oldest distillers and their respected barrel houses used to age spirits do lie within the Southeast, US. While the traditional method is proven, it does not incorporate all aspects of the present general inventive concept other than inducing agitation via hand or mechanical means by moving/rolling barrels around and utilizing ac or heating systems to change the ambient temperature within the barrelhouse or other structure where there is typically no other means to apply significant differential changes to the aging spirits with regards to temperature while aging. In great contrast, some modern spirit aging machinery is able to age spirits within a matter of weeks using vessels that precisely control temperature, pressure, humidity, and agitation, thereby creating the quintessential environment to mature spirits, a phenomenon that would unlikely ever occur in nature. The latter method is also proven; however, it lacks many aspects of the traditional method of aging and therefore is more of an approach for mass production and cost efficiency.

An example of the added benefit of the present general inventive concept is the contrast drawn from the above examples to that of Jefferson's, who offers a blended whiskey that is deliberately aged at sea. Jefferson's loads spirits stored in traditional charred oak barrels into the cargo hold of a ship and the spirits remain manifested cargo until reaching maturity. Each batch is unique due to variances in temperature, pressure, humidity and agitation experienced during that particular series of voyages. The present general inventive concept departs from that model due at least to more rapid and frequent differential changes specifically regarding temperature, pressure, and humidity. Likewise, while agitation is certainly a factor in maritime operations, the duration and even axis of movement is by nature not necessarily comparable between maritime and aeronautical operations. Therefore, the method and system of the present general inventive concept is further set apart from the aging of spirits in a maritime setting.

Other notable examples include Montanya (High Mountain Rum) that both distills and ages their rum on a mountaintop in Colorado at an elevation of 8,900 feet MSL (approximately 10.4 PSI), and Cayman Spirits Company's Seven Fathoms Rum that is aged at a depth of 42 feet (approximately 33.4 PSI) on the floor of the Caribbean Sea. The respective PSI values listed highlight an atmospheric variable (pressure) factored into the production of the spirit with a contrasting spectrum in relation to mean sea level (MSL, approximately 14.7 PSI). Lastly, some of the most significant and impartial evidence regarding the novelty possessed by this present general inventive concept may be gleaned from the experiment conducted by Dr. Bill Lumsden, in which vials of Ardbeg Single Malt Scotch Whisky were launched into space during August of 2011, remaining in Earth's orbit until September of 2014. After re-entry into Earth's atmosphere and recovery from the landing zone, the contents were studied in a laboratory setting and sampled by industry experts in a tasting. A white paper, entitled "THE IMPACT OF MICRO-GRAVITY ON THE RELEASE OF OAK EXTRACTIVES INTO SPIRIT," was subsequently released by Dr. Lumsden detailing the results.

According to various example embodiments of the present general inventive concept, a novel method and system for aging potable ethanol are provided. The present general inventive concept relates to the aging of potable ethanol, or alcoholic spirits to which they are also referred, which ultimately are intended for ingestible human consumption as classified according to various governing bodies by integrating airborne vessels containing said spirits as manifested cargo during flight operations. More particularly, the present general inventive concept relates to a method and system for aging any distilled spirit regardless of classification, such as, for example, rum, whiskey, bourbon, scotch, etc. The present general inventive concept includes a novel technique for aging spirits within an aeronautical operations environment. This general inventive concept is further applicable and adaptable to aging spirits not only associated with global aeronautical operations, but also astronautical operations, due to known quantitative values collected, compiled, and corroborated from astrophysical research including data collected from actual space exploration conducted by the United States and other foreign governmental organizations along with domestic and foreign privately funded organizations.

The present general inventive concept advances the art of aging spirits in that while modern and technologically advanced mechanisms are utilized, those mechanisms indirectly impart the variables providing a uniquely organic experience. No additives or other special chemicals are required for this process. This method is capable of improving upon the duration of necessary aging to maturation while imparting accelerated angel's share loss due to the variables discussed above thereby constituting a combination of which is not found in the traditional aging of spirits and that at this time can only be produced in non-airborne environments by direct processing via modern machinery. Likewise, a conventional warehouse is not needed for the aging of spirits reducing storage costs over the long-term and reduces environmental risks to watersheds in the event of spillage that has occurred in the past. The unique environment and safety culture associated with aviation operations in general, more particularly, that of airport operation and structure affords a lessor risk of environmental damage associated with hazardous spills in great part because of plans in place to mitigate aviation fuel spills and deicing fluid before they reach surrounding watersheds. Additionally, specialists in firefighting and hazardous materials safety are employed by and/or are readily available at the vast majority of US domestic and many foreign airports thereby greatly reducing the chance spillage from storage on airport grounds could negatively impact the safety of persons, property, or the environment. This process is uniquely "unnaturally" natural in that it incorporates unnatural mechanisms (aircraft and looking towards the future—spacecraft) but takes advantage of wholly natural variables that exist in the natural environment assuming you have access to those venues. The technique allows for the accelerated (if desired) aging of spirits in a completely organic environment, a reduction of storage costs when compared to conventional aging methods, and a reduction in overall risk to the environment during the aging process while continuing to allow for a highly tailorable yet unique product.

Various example embodiments of the present general inventive concept may provide a method of aging distilled spirits, the method including storing the distilled spirits in one or more containment vessels, securing the containment vessels in an unpressurized and ventilated cargo area of a selected flight vessel, and transporting the containment vessels from at least a first destination to at least a second destination upon the selected flight vessel. The one or more containment vessels may include white oak barrels. The one or more containment vessels may include casks with charred interiors. The method may further include forming a through hole in the one or more containment vessels, and fitting a diaphragm to the through hole so as to allow for pressure changes in the one or more containment vessels. The diaphragm may be a heavy duty latex balloon. The heavy duty latex balloon may be provided with a puncture resistant sheath. The through hole may be formed in a bung plug of the containment vessel. The diaphragm may be attached to the bung plug by a securing member. The method may further include selecting flights based on variables including destination, duration at destination, cruise altitude, duration of flight, location of frontal boundaries, ambient temperature, humidity at all phases of flight, turbulence, size of the containment vessels, amount of distilled spirits in the containment vessels, or any combination thereof. The selected flight vessel may be a turbo propeller aircraft, jet powered aircraft, or spacecraft. The containment vessels may be transported to and from multiple destinations on a plurality of flight vessels. The method may further include providing an emergency fire suppression system for the cargo area of the selected flight vessel. The stored distilled spirits may be manifested cargo until reaching a desired maturity. The distilled spirits may include rum, whiskey, bourbon, scotch, or any combination thereof.

Various example embodiments of the present general inventive concept may provide a system to age distilled spirits, the system including a containment vessel having a bunghole and configured to store distilled spirits therein, a bung plug configured to be inserted in the bunghole, the bung plug having a channel formed therein in an axial direction, and a diaphragm coupled to the bung plug and configured to contain vapor and/or liquid passed through the channel of the bung plug. The diaphragm may be configured to expand and contract according to the vapor and/or liquid passing through the channel of the bung plug. The diaphragm may be a food-grade latex balloon provided with a fire and puncture resistant sheath.

Various example embodiments of the present general inventive concept may provide a system to age distilled spirits, the system including a plurality of containment vessels respectively provided with bungholes, the containment vessels configured to store distilled spirits therein, at least one vapor collection vessel provided with a diaphragm configured to contain vapor and/or liquid passed from the vapor collection vessel to the diaphragm, and at least one plumbing line configured to provide connection between the vapor collection vessel and the bungholes of the containment vessels, wherein vapor and/or liquid passed from the containment vessels are allowed to pass to and from the vapor collection vessel. Each of the containment vessels may be provided with a bung plug configured to be inserted in the respective bungholes, the bung plugs having a channel formed therein in an axial direction, wherein the at least one plumbing line connects to the containment vessels through the channels in the bung plugs. The at least one plumbing line may include food grade plumbing.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A method of aging distilled spirits, the method comprising:
    forming a through hole in one or more containment vessels;
    storing the distilled spirits in the one or more containment vessels;
    fitting a vapor tight diaphragm to the through hole so as to allow for pressure changes in the one or more containment vessels, wherein the diaphragm is provided with a puncture resistant sheath;
    securing the containment vessels in an unpressurized and ventilated cargo area of a selected flight vessel; and
    transporting the containment vessels on a plurality of flights, including at least one flight from at least a first destination to at least a second destination upon the selected flight vessel.

2. The method of claim 1, wherein the one or more containment vessels include white oak barrels.

3. The method of claim 1, wherein the one or more containment vessels include casks with charred interiors.

4. The method of claim 1, wherein the diaphragm is a heavy duty latex balloon.

5. The method of claim 1, wherein the through hole is formed in a bung plug of the containment vessel.

6. The method of claim 5, wherein the diaphragm is attached to the bung plug by a securing member.

7. The method of claim 1, further comprising selecting flights based on variables including destination, duration at destination, cruise altitude, duration of flight, location of frontal boundaries, ambient temperature, humidity at all phases of flight, turbulence, size of the containment vessels, amount of distilled spirits in the containment vessels, or any combination thereof.

8. The method of claim 1, wherein the selected flight vessel is a turbo propeller aircraft, jet powered aircraft, or spacecraft.

9. The method of claim 1, wherein the containment vessels are transported to and from multiple destinations on a plurality of flight vessels.

10. The method of claim 1, further comprising providing an emergency fire suppression system for the cargo area of the selected flight vessel.

11. The method of claim 1, wherein the stored distilled spirits are manifested cargo until reaching a desired maturity.

12. The method of claim 1, wherein the distilled spirits include rum, whiskey, bourbon, scotch, or any combination thereof.

13. A method of aging distilled spirits, the method comprising:
- storing the distilled spirits in one or more containment vessels, each containment vessel having a through hole formed therein and a vapor tight diaphragm with a puncture resistant sheath fitted to the through hole;
- securing the containment vessels in an unpressurized and ventilated cargo area of a selected flight vessel; and
- transporting the containment vessels on a plurality of flights between multiple destinations.

14. A method of aging distilled spirits, the method comprising:
- storing the distilled spirits in one or more containment vessels, each containment vessel having a through hole formed therein and a vapor tight diaphragm with a puncture resistant sheath fitted to the through hole;
- securing the containment vessels in an unpressurized and ventilated cargo area of a selected flight vessel;
- transporting the containment vessels on a plurality of flights between multiple destinations;
- unloading and securing the containment vessels in an unpressurized and ventilated cargo area of another selected flight vessel; and
- transporting the containment vessels on another plurality of flights between multiple destinations.

* * * * *